Dec. 31, 1929.  H. C. KLONINGER  1,741,993
SYSTEM AND APPARATUS FOR OPERATING ONE OR MORE ELECTRICAL
POWER AUXILIARY STATIONS FROM A CENTRAL STATION
Filed March 20, 1923
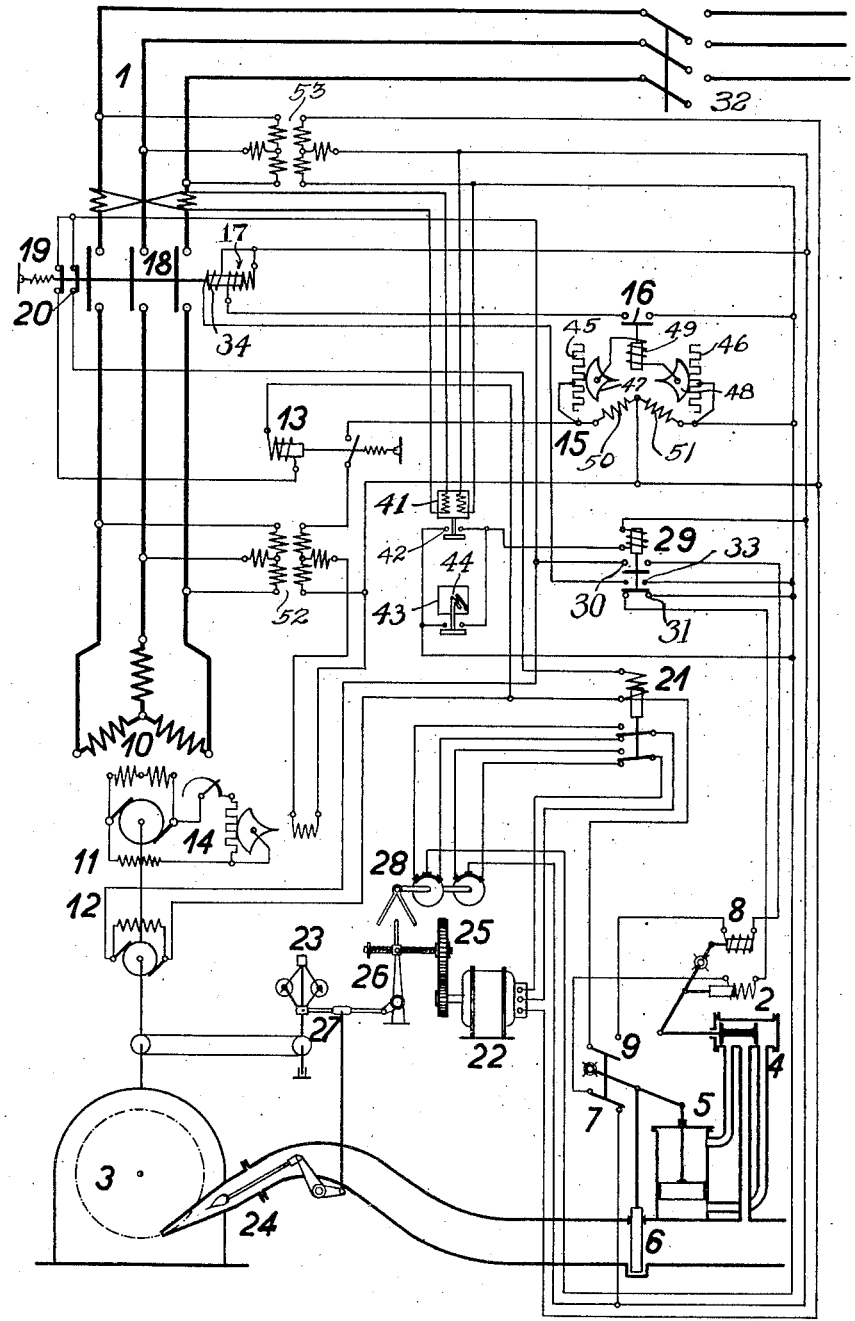
Inventor:
H. C. Kloninger Patented Dec. 31, 1929

1,741,993

UNITED STATES PATENT OFFICE

HANS CONRAD KLONINGER, OF WETTINGEN, SWITZERLAND, ASSIGNOR TO AKTIEN-GESELLSCHAFT BROWN, BOVERI AND CIE., OF BADEN, SWITZERLAND

SYSTEM AND APPARATUS FOR OPERATING ONE OR MORE ELECTRICAL POWER AUXILIARY STATIONS FROM A CENTRAL STATION

Application filed March 20, 1923, Serial No. 626,364, and in Germany April 15, 1922.

Electrical power installations are known in which the network is fed from a central station, and, according to the load conditions, also from one or more auxiliary stations located at a distance from said central station; said auxiliary stations having no direct attendance staff but being brought into and out of operation automatically from the central station.

When the central station requires help in dealing with an increased load, the attendant at that station places the feed main of the selected auxiliary station under voltage. This causes first the prime movers to come into service, and then the synchronous alternators coupled to them are connected (either directly if non-excited, or if excited, through large choking coils) to the network where they are drawn gradually or suddenly into synchronism.

In the first case they are allowed to run asynchronously, and with approaching synchronism, the excitation is effected. In the second case the balancing current generated by wrong parallel-connection is reduced by means of the choking coils to a practical permissible value. Both kinds of parallel connection have considerable drawbacks. The first kind requires specially built machines which have a far lower efficiency than normal synchronous machines. In the second kind, the machines are worked with a very unfavourable load because very great mechanical shocks are caused which are liable to endanger the shafts, the bearings, and the windings. Moreover, large uneconomical choking coils and large switch apparatus are required.

Those drawbacks are avoided, according to the present invention, because the more or less forcible synchronizing of the machines of the auxiliary station is obviated and is replaced by a satisfactory method of synchronizing by means of a special device for connecting in parallel.

The accompanying drawing is a diagram of a hydro-electrical power auxiliary station embodying the improvements of the present invention.

In this illustrated example, a known device for effecting parallel-connection is employed which is distinguished by its simplicity and adjustable sensitiveness.

The operation of the apparatus will now be described with reference to this diagram.

It is first to be assumed that the auxiliary station is disconnected from the central station as shown in the diagram.

In order to place this auxiliary station into service the attendant at the central power station connects the mains 1 leading to the distant auxiliary station by closing the switch 32. By this means, first only the switching-in coil 2 of the turbine 3 receives current and reverses the controlling slide valve 4, so that now the auxiliary hydraulic motor 5 opens the turbine sluice valve 6. At the same time by opening the contact 7, the switching in coil 2 becomes de-energized, while the contact 9 situated in the circuit of the cutting-out coil 8 is closed. The turbine 3 now starts running, and the alternator 10 is brought to voltage by means of its self-excited exciting machine 11. At the same time the tachometer dynamo 12 driven likewise from the turbine 3, generates an electromotive force.

If the speed of rotation of the turbine is approximately normal, the voltage of the tachometer dynamo will be sufficient to cause the relay 13 to respond which sets the automatic parallel connecting device 15 into operation. Then the voltage of the alternator 10 is kept constant by the regulator 14 acting on field of exciter 11. At the same time the automatic connecting device or synchronizing means 15 begins to hunt, and when synchronism is established for a sufficient duration between the network 1 and the alternator 10, it closes the circuit of the switching-in magnet 17 and consequently, also the main switch 18, through the time relay 16 contained in the apparatus.

Meanwhile the contacts 19 and 20 are broken and the circuit of the two relays 13 and 21 is opened. Both of these relays are fed from the tachometer dynamo, but are not used after parallel connection has been effected.

Before the parallel connection has been effected between the two power stations, the relay 21 serves to cause the alternator 10 now and again to run through synchronism. For this purpose a small induction motor 22 is provided which actuates the governor 23 and controls the supply of water to the turbine 3 through the regulating nozzle 24. The motor drives through a first-motion gear 25 the screw 26, the travelling nut of which serves to shift the fulcrum of the governor lever 27, that is to say, in the sense of opening the nozzle when the relay 21 is not excited, so that the turbine will accelerate. At a determined speed of the turbine 3 slightly above the normal speed, the relay 21 attracts its core, and thus reverses the motor 22, so that now the nozzle 24 is gradually closed.

The voltage of the tachometer dynamo drops by reason of its diminished speed of rotation until the relay 21 has again released its armature and has again reversed the motor 22, and so on. The alternator 10 passes each time through synchronism, and it is probable that, at the second time at least, parallel-connection will be established. As already stated, the circuit of the relay 21 is broken at 20 simultaneously with the closing of the main switch 18. The motor 22 then continues to run and moves the travelling nut into the end position in which the nozzle 24 is wide open, and the motor 22 is disconnected by means of a drag-switch 28, whereupon the governor 23 takes over the sole regulation of the speed.

The auxiliary station with the alternator 10 are disconnected from the line by means of the cut-out relay 29. When said cut-out relay is energized, a circuit is established at the relay contacts 30 for energizing the cut-out coil 8 of the slide valve 4. At the same time the cut-out relay 29 opens, at its contacts 31, the circuit for the switching-in coil 2 of the slide valve 4. The energization of the cut-out coil 8 causes the slide valve 4 to be reversed, which in turn results in the closure of the sluice valve 6 through the action of the auxiliary valve motor 5.

The closure of the cut-out relay 29 energizes at its contacts 33 a cut-out coil 34 for the alternator switch 18 to cause opening thereof. The cut-out relay 29 is arranged to be actuated by means of a minimum current delay action relay 41 which is arranged to close its contacts 42 after a certain time when either the main line switch 32 at the central station is open or when the load at the auxiliary station falls below a certain value so that its help is no longer required. The closure of the contacts 42 of the minimum current relay closes an energizing circuit for the cut-out relay 29 causing the latter to be actuated to stop the alternator and open the alternator switch 18, as explained above. The relay 41 may also embody elements to cause it to operate as a maximum current relay, zero voltage relay, reverse power relay, overload relay, or, if desired, separate relays for performing each of said functions may be provided to cause the station to be cut off when either of the conditions for which said relays are set should occur.

In addition to the relay 41, or in general in addition to the relay device which is responsive to the electrical conditions of the line leading from the sub-station, there may also be provided local supervising relays responsive to the operative condition of the mechanisms at the sub-station, such as temperature relays for the windings of the alternator, or for the bearings, indicated diagrammatically at 44. Such local relay device 43 is arranged to close its contacts 44 upon occurrence of abnormal condition which would endanger the operation of the sub-station, for instance, over-heating of the bearings. The closure of the contacts 44 of the local relay also serves to establish an energizing circuit for the cut-out relay 29, and therethrough to cut off the station and stop the operation of the alternator 10. The local relay 43 is preferably so arranged that when actuated to close its contacts 44 it locks itself in the closed condition so as to prevent restarting and renewed switching-in of the station without first resetting the mechanism by hand.

On the other hand, no such hand resetting is required in case the station is cut off by the relay 41 which is responsive to the electrical conditions of the line of the net-work so that if the station is cut off by the response of the line relay 41, the station may be again restarted in the way explained in the first part of the specification by merely closing the main line switch 32.

With the foregoing arrangement a breakdown of the sub-station equipment will completely prevent automatic recoupling of the sub-station, requiring a manual resetting of the relays before such recoupling can take place. On the other hand, a break-down in the net-work permits automatic recoupling without requiring any manual adjustment of the relay devices at the sub-station or otherwise. The relay device 41 may also be so arranged as to cause automatic coupling of the auxiliary station to the net-work independent on the net-work load, or separate relays may be provided for that purpose.

With further regard to the regulating device or synchronizing means 15, the same is shown as being of the same general construction as the regulator shown and described in Patent No. 1,003,600 of Sept. 19, 1911 to Guttinger, and includes the regulating resistance elements 45 and 46 for the time relay 16, the adjustable contact sectors 47 and 48 having rolling adjusting engagement respectively with said elements and providing electrical connections between the later and the operating coil means 49 of the time relay, and the operating coils 50 and 51 for effecting adjusting rolling movement, in the well-known manner, of sectors 47 and 48 on their respective associated resistance elements 45 and 46. The operating coil 50 is subjected, through the transformer 52, to phase conditions of the dynamo or alternator 10, while the operating coil 51 is subjected, through the transformer 53, to phase conditions of the alternating-current power line or source 1, the action, generally, being such that the coils 50 and 51 effect adjusting movement of the sectors in accordance with variation in the relation between the respective phase conditions of alternator 10 and line 1. More specifically, when the respective phases of line 1 and alternator 10 coincide, the operating effect of coils 50 and 51 is zero and sectors 47 and 48 are in their central or mean positions shown. When, however, there is an angular difference between the phases of the line and the alternator, coils 50 and 51 become effective to cause rolling adjusting movement of the sectors to an extent depending upon such difference.

From the foregoing it will be seen that the variable resistance means comprising elements 45 and 46 and the associated sectors 47 and 48 regulates operating action of the relay means 16, and that said resistance means is responsive, through the operating coils 50 and 51 therefor, to the relation between the respective phase conditions of line 1 and alternator 10. If suitable well known modifications are made in the requisite devices, the improved method is also applicable to power stations having other prime movers, such as internal combustion engines, steam engines, etc. On the same principle, a plurality of units in one and the same auxiliary station may be coupled up and cut out automatically all at the same time, or in succession, as required. Moreover, a plurality of auxiliary stations may be coupled up and disconnected in the same manner.

The invention claimed is:

1. Apparatus for operating an alternating current power plant in conjunction with an alternating-current line, said plant containing a synchronous alternator, driving means therefor, alternator switch means for connecting said alternator to said line, means for controlling the operation of the said driving means, an automatic connecting device for connecting the synchronous alternator to the line by actuation of said alternator switch means when synchronism is established, and means responsive to predetermined speed conditions of said driving means and being operable at such conditions to render said connecting device effective with respect to said alternator switch means.

2. Apparatus as claimed in claim 1, including conductors between said switch means and said alternating-current line, line switch means for connecting said conductors to said line, and means for controlling said driving means in response to closure of said line switch means.

3. Apparatus as claimed in claim 1, including a governor for the driving means of said synchronous alternator and means for automatically varying the speed of rotation of said driving means slowly and repeatedly through the synchronous value.

4. Apparatus as claimed in claim 1, including a governor for the driving means of said synchronous alternator and means for automatically varying the speed of rotation of said driving means slowly and repeatedly through the synchronous value and means for stopping automatically the said hunting of the speed of the driving means when parallel connection of the two stations has been effected.

5. Apparatus as claimed in claim 1, including a governor for the driving means of said synchronous alternator and means for automatically varying the speed of rotation of said driving means slowly and repeatedly through the synchronous value, and a generator (12) driven by the driving means of said alternator to control the actuation of said hunting or speed-varying means and the automatic connecting device.

6. In combination, an alternating-current power line, a synchronous alternator for supplying said line, driving means for said synchronous alternator, switching means for connecting said alternator to said line, means responsive to line conditions for causing said driving means to operate said alternator, and means responsive to a predetermined speed condition of said driving means and to the condition of synchronism between said alternator and said line and being operable upon substantially concurrent occurrence of said speed condition and said condition of synchronism to effect closing of said switching means.

7. In combination, an alternating-current power line, a synchronous alternator, switching means for connecting said alternator to said line, driving means for said alternator, means for causing said alternator to be driven through synchronism, means responsive to the condition of synchronism between said alternator and said line for actuating said switching means to connect said alternator to said line, and means responsive to establishment of the connection between said alternator and said line for cutting out the action of the means tending to drive said alternator through synchronism.

8. In combination, an alternating-current power line, a synchronous alternator, switching means for connecting said alternator to said line, driving means for said alternator, means for causing said alternator to change its speed between below synchronism and above synchronism, means responsive to the condition of synchronism of said alternator for effecting closure of said switching means, and means responsive to the closure of said switching means for cutting out the effect of said alternator speed-changing means.

9. In combination, an alternating-current power line, a synchronous alternator, switching means for connecting said alternator to said line, driving means for said alternator, a governor for said driving means to control the speed of said alternator, means independent of the action of said governor for varying the speed of said alternator between below and above synchronism, means responsive to the condition of synchronism of said alternator for closing said switching means, and means responsive to the closure of said switching means for cutting out the action of said alternator speed-changing means and giving effect to the controlling action of said governor.

10. In combination, an independently energized alternating-current supply circuit, a synchronous alternator for additionally supplying said circuit, a line from said alternator to said circuit, line switching means for connecting said line to said circuit, alternator switching means for connecting said alternator to said line, driving means for said alternator, means responsive to the closure of said line switching means for initiating the operation of said driving means to operate said alternator, means actuated by the operation of said alternator for causing the speed thereof to vary between below and above synchonism, means responsive to the condition of synchronism of said alternator for effecting closure of said alternator switching means, and means responsive to the closure of said alternator switching means for rendering ineffective the action of said speed-varying means.

11. In combination, an independently energized alternating-current supply circuit, a synchronous alternator for additionally supplying said circuit, a line from said alternator to said circuit, line switching means for connecting said line to said circuit, alternator switching means for connecting said alternator to said line, driving means for said alternator, means responsive to the closure of said line switching means for initiating the operation of said driving means to operate said alternator, a governor for controlling the speed of said alternator, means independent of said governor actuated by the operation of said alternator to cause the speed thereof to vary between below and above synchronism, means responsive to the condition of synchronism for effecting closure of said alternator switching means, and means responsive to the closure of said alternator switching means for rendering ineffective the action of said speed-changing means and for rendering effective the action of said governor on the speed of said alternator.

12. In combination, an alternating-current power line, an alternating-current dynamo-electric machine, switching means for connecting said machine to said line, driving means for said machine, means responsive to the load condition of said line for causing said driving means to operate said machine, means responsive to the condition of synchronism of said machine for effecting closure of said switching means, means responsive to line conditions for cutting off said machine from said line, and means responsive to local conditions affecting the operativeness of said machine for cutting off said machine from said line, the action of said line responsive cutting-off means disappearing on restoration of line conditions to permit automatic re-connection of said machine to said line, said local cutting-off means being arranged to cause locking thereof in the cut-off condition and requiring manual resetting for permitting re-connection of said machine.

13. In combination, an alternating-current dynamo-electric machine, switching means for connecting said machine to said line, means responsive to predetermined line conditions for initiating the connection of said machine to said line, means responsive to the condition of synchronism between said machine and said line for effecting closure of said switching means, and two sets of safety means for causing disconnection of said machine from said line, one set of safety means causing said machine to be permanently disconnected from said line on occurrence of predetermined conditions and requiring manual resetting for permitting re-connection of the machine, the other set of safety means exercising their control action in response to predetermined operating conditions and permitting automatic re-connection in response to restoration of the operative conditions.

14. The combination of an alternating-current power line, a synchronous alternator, switching means for connecting said alternator to said line, driving means for said alternator, means responsive to line conditions for initiating the operation of said driving means to operate said alternator, speed-varying means responsive to the condition of operation of said alternator for causing variation of the speed thereof between below and above synchronism, synchronizing means actuated in response to the condition of operation of said alternator for determining the relative synchronism between said alternator and said line, said synchronizing means effecting closure of said switch on occurrence of synchronism between said alternator and said line, and means responsive to the closure of said switching means for rendering ineffective the action of said speed-varying means.

15. The combination of an alternating-current power line, a synchronous alternator, switching means for connecting said alternator to said line, driving means for said alternator, means responsive to line conditions for initiating the operation of said driving means to operate said alternator, speed-varying means responsive to the condition of operation of said alternator for causing variation of the speed thereof between below and above synchronism, synchronizing means actuated in response to the condition of operation of said alternator for determining the relative synchronism between said alternator and said line, said synchronizing means effecting closure of said switching means on occurrence of synchronism between said alternator and said line, and means responsive to the closure of said switching means for rendering ineffective the action of said speed-varying means and said synchronizing means.

16. The combination of an alternating-current power line, a synchronous alternator, switching means for connecting said alternator to said line, driving means for said alternator, means responsive to line conditions for initiating the operation of said driving means to operate said alternator, speed-varying means responsive to the condition of operation of said alternator for causing variation of the speed thereof between below and above synchronism, synchronizing means actuated in response to the condition of operation of said alternator for determining the relative synchronism between said alternator and said line, said synchronizing means effecting closure of said switching means on occurrence of synchronism between said alternator and said line, means responsive to the closure of said switching means for rendering ineffective the action of said speed-varying means, and a governor for said driving means rendered effective on closure of said switching means.

17. In combination, an alternating-current power line, a synchronous alternator, switching means for connecting said alternator to said line, driving means for said alternator, line responsive means for initiating the action of said driving means to cause operation of said alternator, speed-varying means for varying the speed of said alternator between below and above synchronism, relay means for actuating said speed-varying means, synchronizing means for determining the condition of synchronism between said alternator and said line, a relay for actuating said synchronizing means, and means responsive to the approach of said alternator to synchronism for actuating said relay means, said synchronizing means effecting closure of said switching means on occurrence of synchronism between said machine and said alternator.

18. In combination, an alternating-current power line, a synchronous alternator, switching means for connecting said alternator to said line, driving means for said alternator, line responsive means for initiating the action of said driving means to cause operation of said alternator, speed-varying means for varying the speed of said alternator between below and above synchronism, relay means for actuating said speed-varying means, synchronizing means for determining the condition of synchronism between said alternator and said line, a relay for actuating said synchronizing means, means responsive to the approach of said alternator to synchronism for actuating said relay means, said synchronizing means effecting closure of said switching means on occurrence of synchronism between said machine and said alternator, and means responsive to the closure of said switch for cutting out the action of said relay means.

19. In combination, an alternating-current power line, a synchronous alternator for supplying said line, driving means for said alternator, switching means for effecting operative connection between said alternator and said line, means responsive to line conditions for effecting operation of said driving means, means responsive to synchronous condition between said alternator and said line and being operable at such condition to effect operation of said switching means, and means responsive to predetermined speed conditions of said driving means and being operable at such speed conditions to render said last-named means effective with respect to said switching means.

20. In an electrical system, an alternating-current power line, a synchronous alternator, driving means for said alternator, and means responsive to a predetermined speed condition of said driving means and to the condition of synchronism between said line and said alternator and being operable upon substantially concurrent occurrence of such conditions to effect an operating connection between said line and said alternator.

21. In apparatus of the character described, an alternating-current power system, an auxiliary alternating-current power system therefor, driving means for said auxiliary system, means responsive to a predetermined speed condition of said driving means and to the condition of synchronism between said systems and being operable upon substantially concurrent occurrence of such conditions to effect an operating connection between said systems, and means responsive to an abnormal operating condition in one of said systems and being operable upon occurrence of such condition to effect removal of said connection.

22. In apparatus of the character described, an alternating-current power system, an auxiliary alternating-current power system therefor, driving means for said auxiliary system, means responsive to a predetermined speed condition of said driving means and to the condition of synchronism between said systems and being operable upon substantially concurrent occurrence of such conditions to effect an operating connection between said systems, and means responsive to an abnormal operating condition in either of said systems and being operable upon occurrence of such condition to effect removal of said connection.

23. In apparatus of the character described, an alternating-current power system, an auxiliary alternating-current power system therefor, driving means for said auxiliary system, means responsive to predetermined current conditions in said first-named system for rendering said driving means effective with respect to said auxiliary system, means responsive to a predetermined speed condition of said driving means and to the condition of synchronism between said systems and being operable upon substantially concurrent occurrence of such conditions to effect an operating connection between said systems, and means responsive to an abnormal operating condition in either of said systems and being operable upon occurrence of such condition to effect removal of said connection and to render said driving means non-effective with respect to said auxiliary system.

24. In electrical apparatus, a power system, a generating system for supplying said power system, driving means for said generating system, switching means for providing an operating connection between said systems, means including a coil responsive to predetermined current conditions in said power system and being operable at such conditions to render said driving means effective with respect to said generating system, and means including a second coil responsive to an abnormal operating condition in one of said systems and being operable upon occurrence of such condition to render said driving means noneffective with respect to said generating system.

25. In electrical apparatus, a power system, a generating system for supplying said power system, driving means for said generating system, switching means for providing an operating connection between said systems, means including a coil responsive to predetermined current conditions in said power system and being operable at such conditions to render said driving means effective with respect to said generating system, and means including a second coil responsive to an abnormal operating condition in either of said systems and being operable upon occurrence of such condition to render said driving means non-effective with respect to said generating system.

26. In electrical apparatus, a power system, a generating system for supplying said power system, driving means for said generating system, switching means for providing an operating connection between said systems, means including a coil responsive to predetermined current conditions in said power system and being operable at such conditions to render said driving means effective with respect to said generating system, and means including a second coil responsive to an abnormal operating condition in one of said systems and being operable upon occurence of such condition to render said driving means non-effective with respect to said generating means, the operating circuits of said coils being interlocked with respect to each other in such manner that the functioning of either coil is subsequent to opening of the operating circuit of the other.

27. In combination, an alternating-current power line, a synchronous alternator for supplying said line, switch means for providing an operating connection between said line and said alternator, synchronizing means having an operating circuit and being responsive to the condition of synchronism between said line and said alternator and being operable at such condition to effect closing of said switch means, and means responsive to closing operation of said switch means and being operable upon such operation to open the operating circuit of said synchronizing means.

28. In combination, an alternating current power line, a synchronous alternator for supplying said line, driving means for said alternator, switch means for providing an operating connection between said line and said alternator, synchronizing means having an operating circuit and being responsive to the condition of synchronism between said line and said alternator and being operable at such condition to effect closing of said switch means, means responsive to a predetermined speed condition of said driving means and being operable at such condition to complete the operating circuit of said synchronizing means, and means responsive to closing operation of said switch means and being operable upon such operation to open the operating circuit of said synchronizing means.

29. In combination, an alternating-current power line, a synchronous alternator for supplying said line, switch means for providing an operating connection between said line and said alternator, relay means for effecting closing operation of said switch means, a resistance element, an adjustable contact sector having rolling adjusting engagement with said element and providing an electrical connection between the same and said relay means, and means for effecting adjusting movement of said sector with respect to said element and including operating coils subject respectively to phase conditions of said line and said alternator.

30. In combination, an alternating-current power line, a synchronous alternator for supplying said line, switch means for providing an operating connection between said line and said alternator, relay means for initiating closing movement of said switch means, variable resistance means for regulating operating action of said relay means, and means responsive to the relation between the respective phase conditions of said line and said alternator for effecting variation of said resistance means.

31. In combination, an alternating-current power line, a synchronous alternator for supplying said line, switch means for providing an operating connection between said line and said alternator, relay means for initiating closing movement of said switch means, and means for regulating operating action of said relay means; said regulating means including a resistance element, an adjustable contact sector having rolling adjusting engagement with said element and providing an electrical connection between the same and said relay means, and means for effecting adjusting movement of said sector, said last-named means being responsive to the relation between the respective phase conditions of said line and said alternator.

32. In apparatus of the character described, a plurality of alternating-current sources, means for providing an operating connection between said sources; and means responsive to the condition of synchronism between said sources and being operable at such condition to effect connecting operation of said first-named means and including a resistance element, an adjustable contact sector having rolling adjusting engagement with said element, and means responsive to the relation between the respective phase conditions of said sources and being operable to effect adjusting movement of said sector in accordance with variation of such relation.

In testimony whereof I have signed my name to this specification.

HANS CONRAD KLONINGER.